United States Patent
Cunico et al.

(10) Patent No.: US 10,970,158 B2
(45) Date of Patent: *Apr. 6, 2021

(54) ROOT CAUSE ANALYSIS

(71) Applicant: INTERNATIONAL BUSINESS MACHINES CORPORATION, Armonk, NY (US)

(72) Inventors: Hernan A. Cunico, Holly Springs, NC (US); Jonathan Dunne, Dungarvan (IE); Jeremiah O'Connor, Roscommon (IE); Asima Silva, Holden, MA (US)

(73) Assignee: International Business Machines Corporation, Armonk, NY (US)

( * ) Notice: Subject to any disclaimer, the term of this patent is extended or adjusted under 35 U.S.C. 154(b) by 41 days.

This patent is subject to a terminal disclaimer.

(21) Appl. No.: 16/545,096

(22) Filed: Aug. 20, 2019

(65) Prior Publication Data

US 2019/0377627 A1    Dec. 12, 2019

Related U.S. Application Data

(63) Continuation of application No. 16/183,911, filed on Nov. 8, 2018, now Pat. No. 10,585,742, which is a
(Continued)

(51) Int. Cl.
*G06F 11/00* (2006.01)
*G06F 11/07* (2006.01)
(Continued)

(52) U.S. Cl.
CPC ............ *G06F 11/079* (2013.01); *G06F 3/012* (2013.01); *G06F 3/013* (2013.01); *G06F 3/023* (2013.01);
(Continued)

(58) Field of Classification Search
CPC . G06F 11/079; G06F 11/0706; G06F 11/0787
See application file for complete search history.

(56) References Cited

U.S. PATENT DOCUMENTS 9,256,784 B1    2/2016  Taylor et al.
10,120,747 B2   11/2018 Cunico et al.
(Continued)

FOREIGN PATENT DOCUMENTS

WO    2012166989    12/2012
WO    2013141751     9/2013
(Continued)

OTHER PUBLICATIONS

Adams, Brett et al.; Situated Event Bootstrapping and Capture Guidance for Automated Home Movie Authoring; Proceedings of the 13th Annual ACM International Conference on Multimedia; Nov. 6-11, 2005; pp. 754-763.
(Continued)

*Primary Examiner* — Katherine Lin
(74) *Attorney, Agent, or Firm* — Schmeiser, Olsen & Watts, LLP; Aaron Pontikos

(57) ABSTRACT

A method and system for performing a root cause analysis. A central processing unit (CPU) tracks a focal point of a user's eye gaze. The CPU correlates the focal point of the user's eye gaze to a viewing position of a display device displaying a file that includes event data being viewed by the user. The CPU identifies, as a function of the viewing position, events of interest in the event data and an amount of time that the event data is viewed by the user. The CPU outputs, as a function of a linear regression model, an interest score pertaining to one or more events of interest that were previously identified as a function of the user's eye gaze. The interest score is a probability of each identified event of interest being a root cause of a defect.

20 Claims, 8 Drawing Sheets

Related U.S. Application Data continuation of application No. 15/836,973, filed on Dec. 11, 2017, now Pat. No. 10,216,565, which is a continuation of application No. 15/248,140, filed on Aug. 26, 2016, now Pat. No. 10,120,747.

(51) Int. Cl.
    *G06F 3/01*           (2006.01)
    *G06F 3/023*         (2006.01)
    *G06F 3/033*         (2013.01)

(52) U.S. Cl.
    CPC .......... *G06F 3/033* (2013.01); *G06F 11/0706* (2013.01); *G06F 11/0787* (2013.01); *G06F 2203/011* (2013.01)

(56) References Cited

U.S. PATENT DOCUMENTS

| | | | |
|---|---|---|---|
| 10,216,565 | B2 | 2/2019 | Cunico et al. |
| 2010/0004977 | A1 | 1/2010 | Marci et al. |
| 2010/0174586 | A1 | 7/2010 | Berg, Jr. et al. |
| 2011/0256520 | A1 | 10/2011 | Siefert |
| 2014/0280087 | A1 | 9/2014 | Isensee et al. |
| 2014/0363059 | A1 | 12/2014 | Hurewitz |
| 2015/0339527 | A1 | 11/2015 | Plummer et al. |
| 2016/0055378 | A1 | 2/2016 | Anderson et al. |
| 2016/0191995 | A1 | 6/2016 | el Kaliouby et al. |
| 2016/0283304 | A1 | 9/2016 | Horikawa et al. |
| 2018/0060150 | A1 | 3/2018 | Cunico et al. |
| 2018/0101426 | A1 | 4/2018 | Cunico et al. |
| 2019/0087255 | A1 | 3/2019 | Cunico et al. |

FOREIGN PATENT DOCUMENTS

| | | |
|---|---|---|
| WO | 2014025711 | 2/2014 |
| WO | 2015175325 | 11/2015 |

OTHER PUBLICATIONS

Office Action (dated Feb. 9, 2018) for U.S. Appl. No. 15/836,973, filed Dec. 11, 2017.
Amendment (dated May 2, 2018) for U.S. Appl. No. 15/836,973, filed Dec. 11, 2017.
Final Office Action (dated Jun. 15, 2018) for U.S. Appl. No. 15/836,973, filed Dec. 11, 2017.
Final Amendment (dated Aug. 15, 2018) for U.S. Appl. No. 15/836,973, filed Dec. 11, 2017.
Notice of Allowance (dated Oct. 10, 2018) for U.S. Appl. No. 15/836,973, filed Dec. 11, 2017.
Office Action (dated Feb. 8, 2018) for U.S. Appl. No. 15/248,140, filed Aug. 26, 2016.
Amendment (dated May 2, 2018) for U.S. Appl. No. 15/248,140, filed Aug. 26, 2016.
Notice of Allowance (dated Jun. 29, 2018) for U.S. Appl. No. 15/248,140, filed Aug. 26, 2016.
Notice of Allowance (dated Nov. 8, 2018) for U.S. Appl. No. 16/183,911, filed Nov. 8, 2018.

| Screen Position | Time Viewed | Emotive Expression | Text of Event Data | Interest Score |
|---|---|---|---|---|
| A1 | 15 sec. | serenity | I WIO channel was closed, reason [0] | 0.55 |
| A2 | 36 sec. | annoyance | [4/10/15 7:33:43:497 GMT] [Servlet Error] - [STPProxyServlet]: java.lang.NullPointerException | 0.85 |
| B2 | 15 sec. | interest | Channel to OfflineMessageService failed to open type [MSG_GET_OFFLINE_MSGS] reason [-2147483635] | 0.54 |
| B5 | 15 sec. | anticipation | 00000c68 STPProxyServlet CLFRX0050E: User null - /stwebapi/user/status - 10.1.6.12 is not authenticated | 0.48 |
| C1 | 5 sec. | acceptance | I WIO channel was closed, reason [0] | 0.3 |
| C3 | 48 sec | anger | [4/10/15 7:33:30:185 GMT] 00000514 comparch run Exception on MessageDispatcher | 0.79 |

FIG 5

ROOT CAUSE ANALYSIS

CROSS REFERENCE TO RELATED APPLICATIONS

This application is a continuation application claiming priority to Ser. No. 16/183,911, filed Nov. 8, 2018, which is a continuation of Ser. No. 15/836,973, filed Dec. 11, 2017, U.S. Pat. No. 10,216,565, issued Feb. 6, 2019, which is a continuation of Ser. No. 15/248,140 filed Aug. 26, 2016, U.S. Pat. No. 10,120,747, issued Nov. 6, 2018.

TECHNICAL FIELD

The present disclosure relates generally to systems, methods and tools for performing a root cause analysis.

BACKGROUND

Computer systems experience technical issues, defects, crashes or complications that should undergo troubleshooting techniques to remove the causes of abnormal termination or other issues the computer system is experiencing. Software typically contains a number of defects or errors which may be classified into two general categories; the first is the category that causes crashes, while the other category may cause the computer system to hang. Among the chief concerns for program developers is to identify software or other system defects that cause computer systems to experience crashing or hanging. Software crashes can range in severity. In some instances the cause of the crash may be due to fatal system errors, which usually result in the abnormal termination of a program by a kernel or system thread. Normally, when a crash-causing defect is discovered, the software provider obtains diagnostic data, attempts to reproduce the error, and, depending on the severity of the defect, creates and distributes a fix for the defect.

One way to diagnose the cause of the crash involves examining log files containing diagnostic data including commands, events, instructions, program errors, computer system hardware specification, and/or other pertinent diagnostic information. The log file typically is generated right after a crash has been detected. After a crash, the log file may be sent to the software provider for analysis. In some cases, a log file does not contain enough information to diagnose a problem, thus, a crash dump may be required to troubleshoot the problem. A crash dump is generated when the physical contents of the computer system's memory are written to a predetermined file location.

SUMMARY

A first embodiment of the present disclosure provides a method for performing a root cause analysis comprising the steps of: opening, by a central processing unit (CPU), a file comprising event data; receiving, by the CPU, a recordation of the user's observable while viewing the event data of the file; identifying, by the CPU, a presence of one or more events of interest as a function of the user's observable behavior while viewing the event data of the file; calculating, by the CPU, an interest score for each of the identified events of interest, wherein the interest score is a probability of each of the identified events of interest being a root cause of a defect; and tagging, by the CPU, each of the events of interest within the file with a tag as a function of each calculated interest score.

BRIEF DESCRIPTION OF THE DRAWINGS

FIG. 5 depicts an embodiment of a table of entries identifying events of interest consistent with the embodiment for performing the root cause analysis of the present disclosure.

DETAILED DESCRIPTION

Overview

Figure 1:
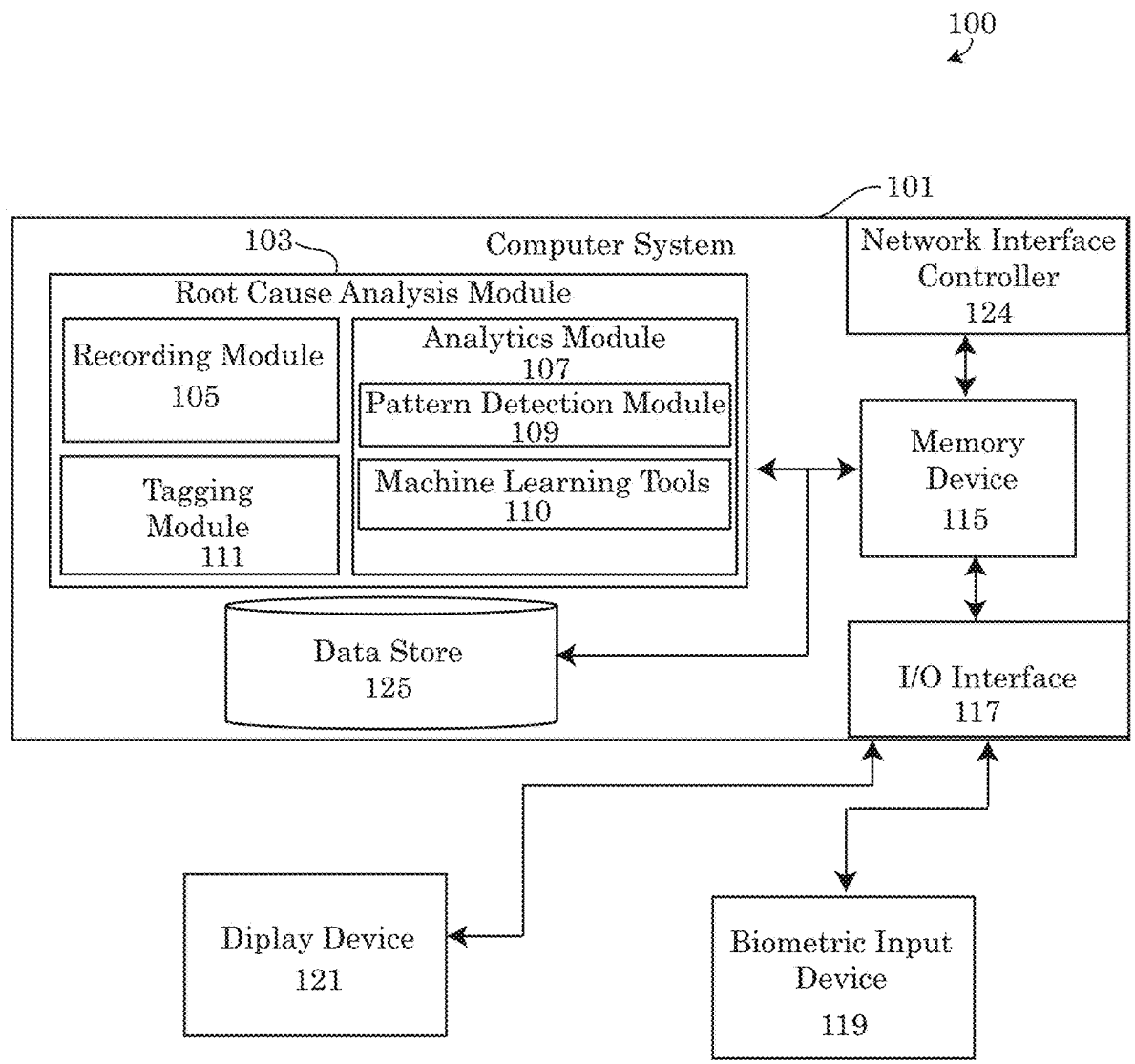
FIG. 1 depicts a schematic view of embodiment of a system for performing a root cause analysis, consistent with the embodiments of the present disclosure.
Figure 2:
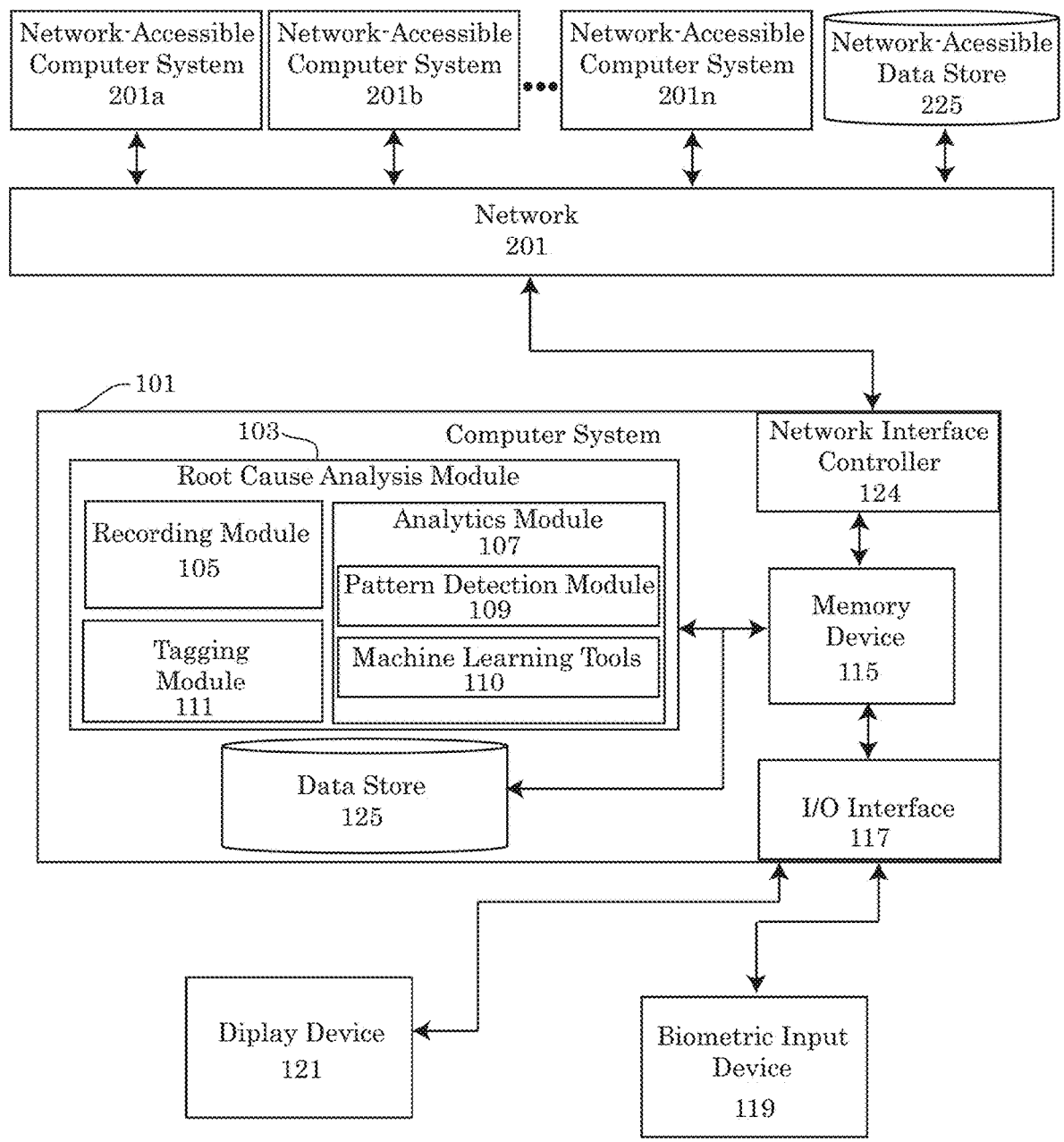
FIG. 2 depicts a schematic view of a network enabled embodiment of a system for performing a root cause analysis, consistent the embodiments of the present disclosure.

Embodiments of the present disclosure recognize that determining the root cause of a defect, crash or error in a computer system can be time consuming. Often, determining the root 3 of 41 cause involves parsing and analysis of domain specific log files, configuration files, crash dumps and other inputs by system operators, support personnel or developers. Embodiments of the present disclosure further recognize that users and troubleshooters reviewing the computer system's error files and logs have varying degrees of expertise, availability and resource costs. Subject matter experts (SME) are highly skilled individuals that are most likely able to quickly determine the root cause of a defect, crash or system error. SMEs however may be a scarce and more costly resource to utilize. Due to the SMEs scarcity, over-relying on feedback from an SME may bottleneck the identification and resolution of the problems currently being experienced by a computer system.

Embodiments of present disclosure improve the system error detection and streamline the focus of the SMF reviewing data files, logs, crash dumps or other files to reduce the overall amount of time, energy and resource investment that may be required by the SME to identify the root cause of a system's failure. The embodiments of the present application achieve these improvements in root cause detection by changing the way analysts and troubleshooters that have less experience or training that SMEs interact with the logs or other error containing files to detect injection points in the log or other file likely to indicate the root cause of the system error.

Embodiments of the systems, methods and tools of the present disclosure record the observable behavior of users as the user reviews the log files or other error containing files.

Embodiments of the systems, methods and tools identify behavioral and contextual cues of the user and trouble shooter to infer a level of interest of the reviewer to particular sections of the files being viewed. Using the reviewers' head movements, eye movements, facial expressions, and general behavior recorded during the review process, embodiments of the systems, methods and tools are able to identify sections of the reviewed files that are most likely to be the root cause of the defects and errors. The systems, methods and tools of the present disclosure may numerically rate each of the parameters of the sections of interest based on the reviewer's observed and/or recorded behavior. Then, based on the numerical values assigned, a particular level of importance to each section of the files reviewed and determined to be of interest to the reviewer may be identified and a probability of the likelihood that a section of the file may be a root cause can be calculated.

In some embodiments, the systems tools and methods may tag the sections of the reviewed file with markings or color coded tags to draw a subsequent reviewer's attention (such as an SME) to the most relevant causes of the defect or error. As a result of identifying sections of interest by importance from the previous reviewers, a subsequent and potentially more resource intensive reviewer may focus quickly on the important or pertinent sections of the reviewed files. Instead of having to review the entire file from start to finish. Thus expediting the identification of the root cause of the system defects or errors and resolving the problem ore efficiently, improving system functionality while reducing the amount of resources expended.

System for Performing Root Cause Analysis

Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure. A more complete understanding of the present embodiments and advantages thereof may be acquired by referring to the following description taken in conjunction with the accompanying drawings, in which like reference numbers indicate like features.

As a preface to the detailed description, it should be noted that, as used in his specification and the appended claims, the singular forms "a", "an" and "the" include plural referents, unless the context clearly dictates otherwise.

Referring to the drawings, FIG. 1 depicts a block diagram of an embodiment of a system 100 for performing a root cause analysis consistent with the disclosure of this application. Embodiments of the system 100 may be performed by a computer system 101. The computer system 101 may be a specialized computer system, having specialized configurations of hardware, software or a combination thereof as depicted FIGS. 1-3*d* of the present disclosure in some embodiments. Embodiments of the computer system 101 may also comprise one or more elements of the generic computer system 700 of FIG. 7 as described in detail below. One or more elements of the generic computer system of FIG. 7, may be integrated into the specialized computer system 101 of FIGS. 1-3*d*.

Embodiments of the computer system 101 of the system 100 for performing a root cause analysis may include a root cause analysis module 103. The term "module" may refer to a hardware based module, software based module or a module may be a combination of hardware and software resources. A module (whether hardware, software, or a combination thereof) be designed to implement or execute one or more particular functions, tasks or routines. Embodiments of hardware based modules may include self-contained components such as chipsets, specialized circuitry and one or more memory devices, while a software-based module may be part of a program code or linked to program code containing specific programmed instructions loaded in the memory device 115 of the computer system 101 or a remotely accessible memory device (not shown).

Embodiments of the root cause analysis module 103 may utilize specialized hardware, circuitry or software loaded in the memory device 115 or a combination thereof to collect, gather and sort data relating to the root cause of a system defect, error or failure (hereinafter collectively referred to as "defects" including recordings of the observable behavior of users or troubleshooters observing the collected data. The root cause analysis module 103 may analyze and identify the system environment and circumstances surrounding the root causes of the defects as a function of the data collected and recorded behavior of the users. The root cause analysis module 103 may organize the collected data to draw conclusions about the importance of events described by the collected data and subsequently tag files containing the collected data with identifying information to further assist and focus the attention of analysts, troubleshooters or SMEs (referred to interchangeably as the "user") to the most probable root causes of the defects.

In some embodiments, the root cause analysis module 103 may comprise one or more individual hardware and/or software modules to perform each task, routine or service provided by the root cause analysis module 103. For example, in the exemplary embodiment in FIG. 1, the root cause analysis module 103 may comprise a recording module 105, analytics module 107 and a tagging module 111. Embodiments of the recording module 105 may perform the task of collecting and recording audio and visual data of each user as the user interacts with and reviews a file describing events that may have caused the defects to occur. Examples of the files being reviewed for the root cause of the defects may include log files, network files, data files, data dumps, crash logs, configuration files, source code, program code, or any other text based data describing conditions, operating environment, code that may lead to system errors, defects, crashing or other undesirable effects.

In some embodiments, the recording module 105 may record audio data and video data from one or more input devices. For example, in some embodiments the computer system may receive input from a biometric input device 119, a camera, microphone or other input device connected to the computer system 101. Embodiments of the biometric input device 119 may be equipped with specialized facial recognition software capable of recording and identifying from recorded video data, the observable behavior of user, including the user's facial expressions, head movements, eye movements, direction of the user's eye gaze, the user's emotive reaction and auditory sounds. In some embodiments, the computer system 101 may be able to identify specific text or information presented to the user that is the cause of the observable behavior using a combination of the recording module 105, analytics module 107 and/or the biometric input device 119.

Referring to the drawings, FIG. 3*a*-3*d* illustrates embodiments of a system 300 for performing a root cause analysis to identify one more defects. As demonstrated by the drawings, the computer system 101 of system 300 may include a display device 121 displaying a file being reviewed by a user

301. Embodiments of the biometric input device 119 are shown to be tracking the user's 301 head movements 303*a*, 303*b*, focal point of a user's gaze/eye movements 305*a*, 305*b* and changes in emotive expression 309*a*, 309*b* as the user observes one or more events 321*a*, 321*b* of the file being displayed.

Figure 3A:
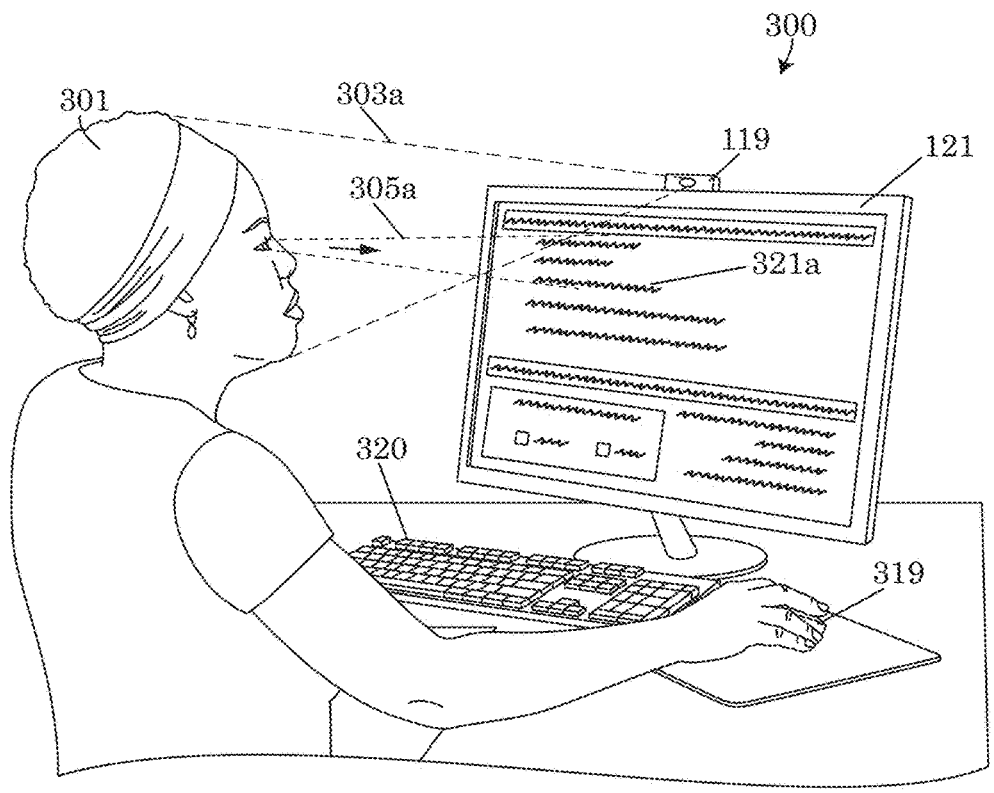
FIG. 3a illustrates an embodiment of a system for performing a root cause analysis, collecting observable behavior data of a user in a first position.
Figure 3B:
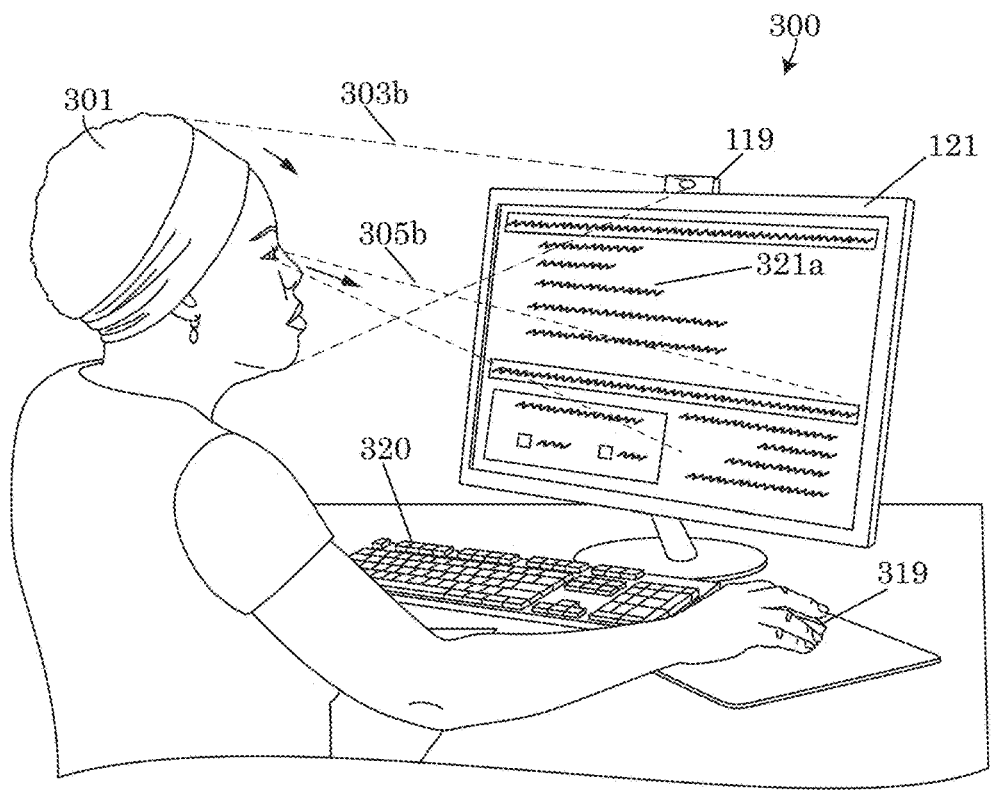
FIG. 3b illustrates an embodiment of a system for performing a root cause analysis, collecting observable behavior data of a user in a second position.

As shown by the comparison between FIGS. 3*a* and 3*b*, the biometric input device 119 may use the user's head movements 303*a*, 303*b* and eye movements 305*a*, 305*b* to identify the section 321*a*, 321*b* of the file the user 301 is currently viewing on the display device 121. As the recording module 105 records the change in position of the user's head movements 303*a*, 303*b* and eye movements 305*a*, 305*b*, the root cause analysis module 103 can track which part of the file the user 301 is focused on viewing and correlate the user's behavior and expressions to identify which portions of the file are events of interest. An event of interest may be a section or portion of the file being analyzed for a root cause of a defect, error, inconsistency or other problem that may have one or more indications that would increase the probability of being the root cause. As depicted by the examples provided in the drawings, the computer system 101 is shown tracking the user's 301 downward head movement 303*a*, 303*b* and eye movements from a first focal point direction 305*a* to a second focal point direction 305*b*. Based on the head and eye movements of the user 301, the computer system 101 and/or biometric input device 119 may accurately predict the section of the file 321*a*, 321*b* that is currently being focused on by the user 301.

Figure 3C:
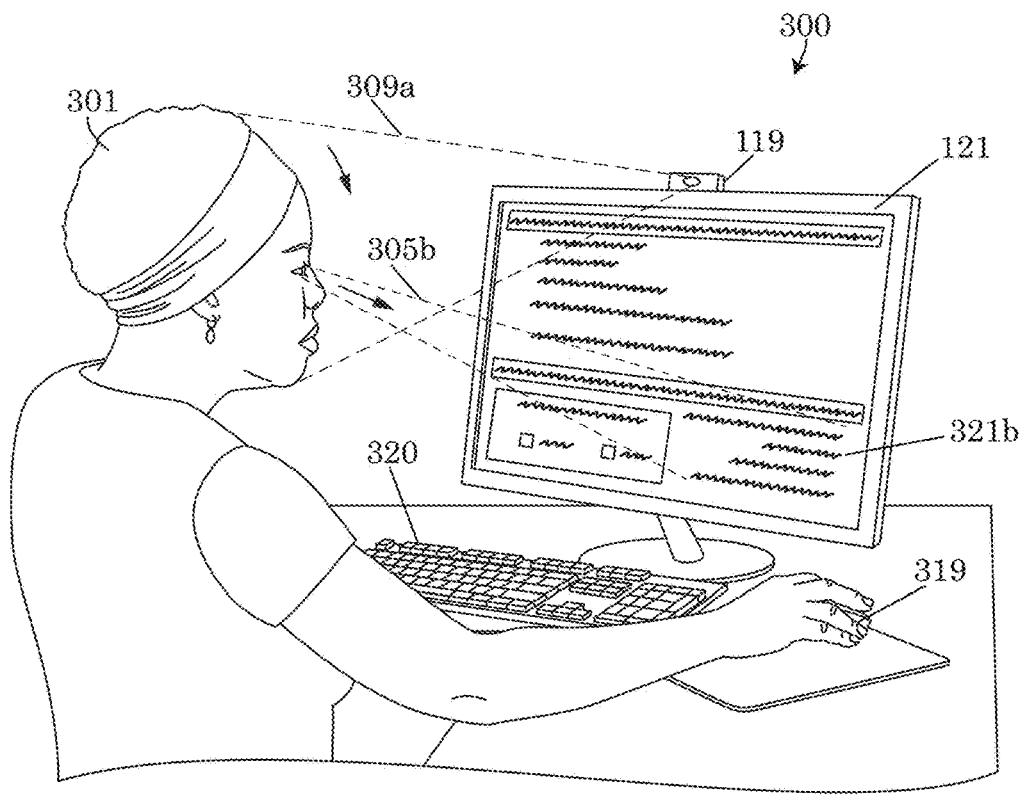
FIG. 3c illustrates an embodiment of a system for performing a root cause analysis, collecting observable behavior data of a user expressing a first emotive response.
Figure 3D:
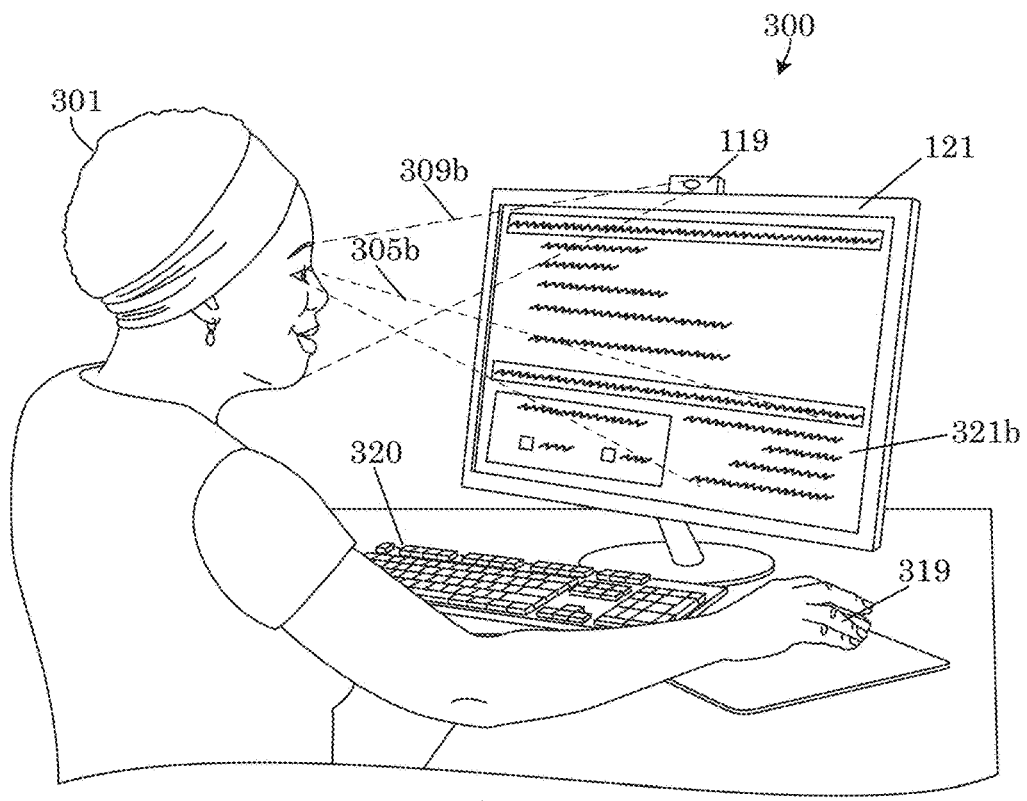
FIG. 3d illustrates an embodiment of a system for performing a root cause analysis, collecting observable behavior data of a user expressing a second emotive response.

FIGS. 3*c*-3*d* presents an illustration demonstrating the recordation of an example of observable behavior that may be tied to the observance of a particular section of the file being reviewed by the user 301. As shown in FIG. 3*c* and FIG. 3*d*, the computer system 101 continues to track the head movements 303*a*, 303*b* and eye movements 305*a*, 305*b* to identify that the user 301 is viewing section 321*b* of the file. The computer system 101 is further able to identify the change in observable behavior in the user from expression 309*a* to 309*b* upon viewing section 321*b* of the file. The recording module 105 may observe the change in observable behavior and the computer system 101 may note the change in expression, the type of expression displayed and mark section 321*b* of the file being viewed at the time of the expression change as a potential event of interest.

In some embodiments, the computer system 101 may not only rely on the user's 301 observable behavior to identify events of interest in the file being reviewed, rather the recording module 105 of the computer system 101 may further track numerous input devices attached to the computer system to further identify events of interest based on user behavior. For example, keystrokes on a keyboard 320 or mouse 319 movements may provide the computer system with important data that may be collected and recorded by the recording module. For instance, the computer system 101 may continue to track head and eye movements, but the user 301 may use the mouse to further highlight the section of text in the file currently being viewed when an observable expression is made by the user 301. The computer system 101 may not only make use of the visual data collected by the biometric input device 119 but furthermore use the mouse 319 movement data to further assist with identifying the precise location of the file the user 301 was observing at the time of the change in facial expression.

The input data recorded by the biometric input device 119 and other input devices attached to the computer system 101 may be transmitted to the computer system 101 via an input/output (I/O) interface 117, wherein the input data received by the computer system 101 may be stored in the memory device 115 of the computer system and/or stored computer-readable storage device such as a data store 125. An I/O interface 117 may refer to any communication process performed between the computer system 101 and the environment outside of the computer system 101, for example the biometric input device 119 and display device 121 and peripheral devices attached to the computer system, including mouse 319 and keyboard 320. In some embodiments of system 100, the recording module 105 may further record and store keystrokes or mouse movements performed by a user on a keyboard and/or mouse movements inputted into the computer system 101. The inputted keystrokes, mouse movements and biometric input data provided by the biometric input device 119 may all be recorded by recording module 105 used to correspond observable behavior of the user 301 to identify events of interest occurring in the files being reviewed by the user.

Embodiments of the root cause analysis module 103 may further include an analytics module 107. The analytics module may perform data analysis on the data recorded by the recording module 105 of the computing system 101, including data describing the observable behavior of the user reviewing one or more files. The analytics module 107 may perform a statistical analysis of the data recorded by the recording module 105 with the purpose of drawing conclusions about the recorded data and the implications of the recorded data on the observable behavior of the user and events of interest in the files being reviewed by the user.

The predictive analytics of the analytics module 107 may use a set of one or more mathematical techniques or algorithms applied to the data recorded by the recording module 105 to identify events of interest in the files being reviewed by users as a function of the users observable behavior including head movements, eye movements, gaze and emotive behavior during the period of review as well as input data from input devices. The analytics module 107 may tabulate the collected data from the recording module 105 and identify each section of text being viewed for each piece of recorded data. In some embodiments, the analytics module may further extract from the recorded data collected by the recording module 105, the events of interest and the corresponding variables of observable behavior that may have led to the conclusion by the analytics module 107 that a particular data set is directed toward an event of interest.

To assist the analytics module 107 in performing the mathematical techniques and analysis of the many variables present in the recorded data collected by the recording module 105, the analytics module 107 may further include one or more additional modules or plugins. As shown in the exemplary embodiment of FIG. 1, the analytics module 107 may further comprise a pattern detection module 109 and machine learning tools 110.

Embodiments of the pattern detection module 109 may allow for machine learning to occur which may focus on the recognition of patterns and regularities in the recorded data and may further allow for the analytics module 107 to draw conclusions about the recorded data and associated events f interest in the file being reviewed by one or more users. The pattern detection module 109 may draw conclusions about patterns recognized within the recorded data collected from the recording module 105 as well as patterns identified when the analytics module 107 fits the recorded data to one or more statistical models. In some embodiments, the pattern detection module 109 may be capable of correlating head position, eye movements, gaze and other observable behaviors of the user reviewing the file to determine a corresponding section of the file being viewed as well as the corresponding text as a function of the observable behavior. Examples of pattern recognition models that the pattern detection module 109 may utilize to identify events of interest and probability of root cause as a function of observable behavior of a user viewing a file may include a linear discriminate analysis, statistical classification, regression, sequence labeling, and statistical inferences.

The machine learning tools 110 of the analytics module 107 may provide a collection of one or more machine learning algorithms which allow for the analytics module 107 to evaluate the recorded data provided by the recording module to identify events of interest and ultimately determining the root cause of a defect, error or other irregularity. The pattern detection module 109 may use one or more of the machine learning models to draw conclusions and recognize patterns in the recorded data. The patterns may identify events of interest based on the patterns of previous users as well as knower behavioral patterns of particular users.

There are two general styles of algorithms that may be included as part of the machine learning models. The first grouping of algorithms may be referred to as "learning style" algorithms, while the second grouping may be referred to as algorithms that draw conclusions by similarity or function. Learning style algorithms may include supervised learning, unsupervised learning and semi-supervised learning algorithms, while algorithms that draw conclusions by learning or function may include regression algorithms, instance based algorithms, regularization algorithms, decision tree algorithms, Bayesian algorithms, clustering algorithms, association rule learning algorithms, artificial neural network algorithms, deep learning algorithms, dimensionality reduction algorithms and ensemble algorithms.

Supervised learning algorithms may refer to analytics techniques and algorithms that use training data where known input data having a known label or result teach the machine how to interpret unknown data being fed to the analytics engine. The supervised learning model places the analytics module 107 through a training process where the analytics module 107 may make predictions about events of interest derived from observable data and is corrected when the predictions are wrong. The training process may continue until the model achieves a desired level of accuracy on the training data. Examples algorithms that use supervised learning techniques include logistic regression and back propagation neural network.

Unsupervised learning is an analytics technique where input data is not labeled or does not have a known result. Instead, a model is prepared by deducing structures present in the input data. This technique may result in extraction of general rules. The algorithms, through a mathematical process, may systematically reduce redundancy, or it may be used to organize data by similarity. Example algorithms include Apriori algorithm and k-Means.

In some embodiments, regression algorithms may be used as an analytics model for machine learning. Regression modeling models the relationship between variables that are then refined using a measure of error in the predictions made by the model. Some exemplary regression algorithms that may be used by the analytics module 107 may include ordinary least square regression (OLSR), linear regression, logistic regression, stepwise regression, multivariate adaptive regression splines (MARS), and locally estimated scatterplot smoothing (LOESS).

Instance based learning models a decision problem with instances or examples of training data that are deemed important or required to the model. Such methods typically build up a database of example data and compare new data to the database using a similarity measure in order to find the best match and make a prediction. Focus is put on representation of the stored instances and similarity measures used between instances. Examples of this instance based learning algorithms may include k-nearest neighbor (KNN), learning vector quantization (LVQ), self-organizing map (SOM) and locally weighted learning (LVL).

Regularization algorithms are algorithms that act as an extension to other algorithms described in this application, usually regression techniques. The regularization algorithm may penalize models based on their complexity, by favoring simpler models that are more efficient at generalizing. Regularization algorithms may include ridge regression, least absolute shrinkage and selection operator (LASSO), elastic net and least-angle regression (LARS).

Decision tree algorithms may be one exemplary algorithm used by the analytics engine, in addition to the k-clustering techniques described above. Decision tree methods construct a model of decisions based on the actual values and attributes of the user data collected and provided to the analytics engine. The decision tree algorithm forks in tree structures until a prediction decision is made for a given record being analyzed. Decision trees may be trained on data for classification and regression problems. Examples of decision tree algorithms that may be used and applied to the collected data may include classification and regression tree (CART), iterative Dichotomiser 3 (ID3, C4.5/C.5.0, chi-squared automatic interaction detection (CHAID), decision stump, M5 and conditional decision trees.

Bayesian algorithms are methods that explicitly apply Bayes' theorem. These algorithms may generally be used for solving problems such as classification and regression. Popular Bayesian algorithms may include naïve Bayes, Gaussian naïve Bayes, multinomial naïve Bayes, averaged one-dependence estimators (AODE), Bayesian belief network (BBN) and Bayesian network (BN).

Clustering algorithms are generally directed toward created models that organize data collected into a centroid based and hierarchal structure. These methods, as described above when discussing k-means clustering, use the inherent structures in the data to organize the data into groups that have the maximum amount of commonality between the groups and the maximum amount of differences between groups. In addition to k-means clustering, other types of clustering algorithms may include k-medians, expectation maximization (EM), and hierarchical clustering.

Much like clustering algorithms, dimensionality reduction algorithms seek and exploit the inherent structure in the data, but in this case in an unsupervised manner to summarize, order and describe data using less information. Dimensionality reduction algorithms can be helpful to visualize dimensional data or to simplify data which can then be used in a supervised learning method. Many of these dimensional methods can be adapted for use alongside classification and regression techniques. Examples of dimensionality reduction algorithms may include Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), and Flexible Discriminant Analysis (FDA).

Embodiments of the recorded data received by the analytics module 107 may be received from one or more data sources, for example the biometric input device 119, mouse, keyboard, pointer device, webcam etc. The information provided to the analytics module 107 may then be subsequently predictively analyzed, stored and/or retained by the computer system 101 in one or more databases and/or data warehouses such as data store 125 and may be recalled or queried at a later point in time. The data being recorded by the recording module 105 may be transmitted to the analytical module 107 continuously as a constant stream of data from one or more data sources, at discrete time intervals providing refreshed updates upon request by the analytics module 107 or at a moment when the information of an inputted a data source has been updated to reflect a change.

Embodiments of the analytics module 107 may use pattern detection and machine learning techniques to organize the recorded data into meaningful conclusions and generate a probability of an event of interest being a root cause of an error, defect or other problem. FIG. 5 provides an example of a table resulting from the organization and analysis of the recorded data collected by the recording module and analyzed by the analytics module 107. The tabulated data organized by the analytics module may be calculated as a function of a user's observable behavior to identify one or more events of interest, generate one or more properties identifying each event of interest and finally calculating an interest score as a function of the recorded data that may include the observable behavior of the user.

As shown in FIG. 5, the analytics module may identify one or more properties of each event of interest to organize and calculate an interest score 509. Properties of each event of interest may include the screen position 501 where the event of interest may have been identified in a filed, the amount of time 503 that the event of interest was viewed or focused on by a user, the emotive expression 505 of the user during the time period 503 that the event of interest was viewed and the actual text of the event data 507, specifically describing the section of the file being viewed by the user.

The property of screen position 501 may be determined by the analytics module 107 by overlaying or assigning a grid or table to each of the positions of the display device 121 display area. For example, the screen position 501 may be based on dividing the display device's display area into a Cartesian plane having X, Y coordinates in some embodiments. In alternative embodiments, the screen position may be based on a series of rows and columns, each having a pre-defined space on the display area of the display device 121. For example, defining each row by letters A-Z, AA-ZZ etc., and each column as an integer 1-n, where n is the last column number in the sequence of numbered columns. For instance, A1 is the section of the screen denoting the first row, first column, whereas A2 is the first row, second column. Likewise, screen position C1 may be the third row, first column. In some alternative embodiments, the screen position may be defined absolutely by the location or range of location of the specific pixels contributing to the formation of the text displayed by the display device 121.

Embodiments of the viewing time 503 for each event of interest may be calculated by the analytics module as a function of the head movements, eye movements and gaze of the user. The analytics module 107 may calculate the section of the file that the user is focusing and the associated text of the event data 507 and may continuously track the focus of the user until the user moves the user's focus to a different section of the file. In some embodiments, the analytics module 107 may further track a user's focus of the head and eye movements to identify the length of time and number of times a user's focus returns back to a particular set of text in the file being reviewed. The observable behavior of the user's focus diverting back a particular text of event data 507 may be a further indicator of an event of interest and be calculated as part of the viewing time 503 because the cumulative amount of time viewed 503 may be factored into or impact the overall interest score 509.

The emotive expression 505 may identify the changes in the user's emotions as the user is reviewing the file for the root cause of the defects. Changes in emotion, such as facial expression can provide clues into the cognition of the reviewing user and provide clues to whether particular sections of the file's text are being considered events of interest by the user. The strength of the emotive expression of each user may vary. Stronger expressions, whether happy, sad, angry, joyful etc. may provide stronger indications that an event of interest has been identified and may increase the likelihood that a root cause of a defect has been identified. For example, a strong indication of happiness may identify to the analytics module 107 that a user may have identified what the user believes to be the root cause of the defects. Conversely, a strong emotive expression of anger may also identify a higher likelihood that a root cause has been identified. For instance, the defect presented as text of event data 507 may be glaringly obvious or incorrect source code that should have been identified before the defect occurred.

Figure 6:
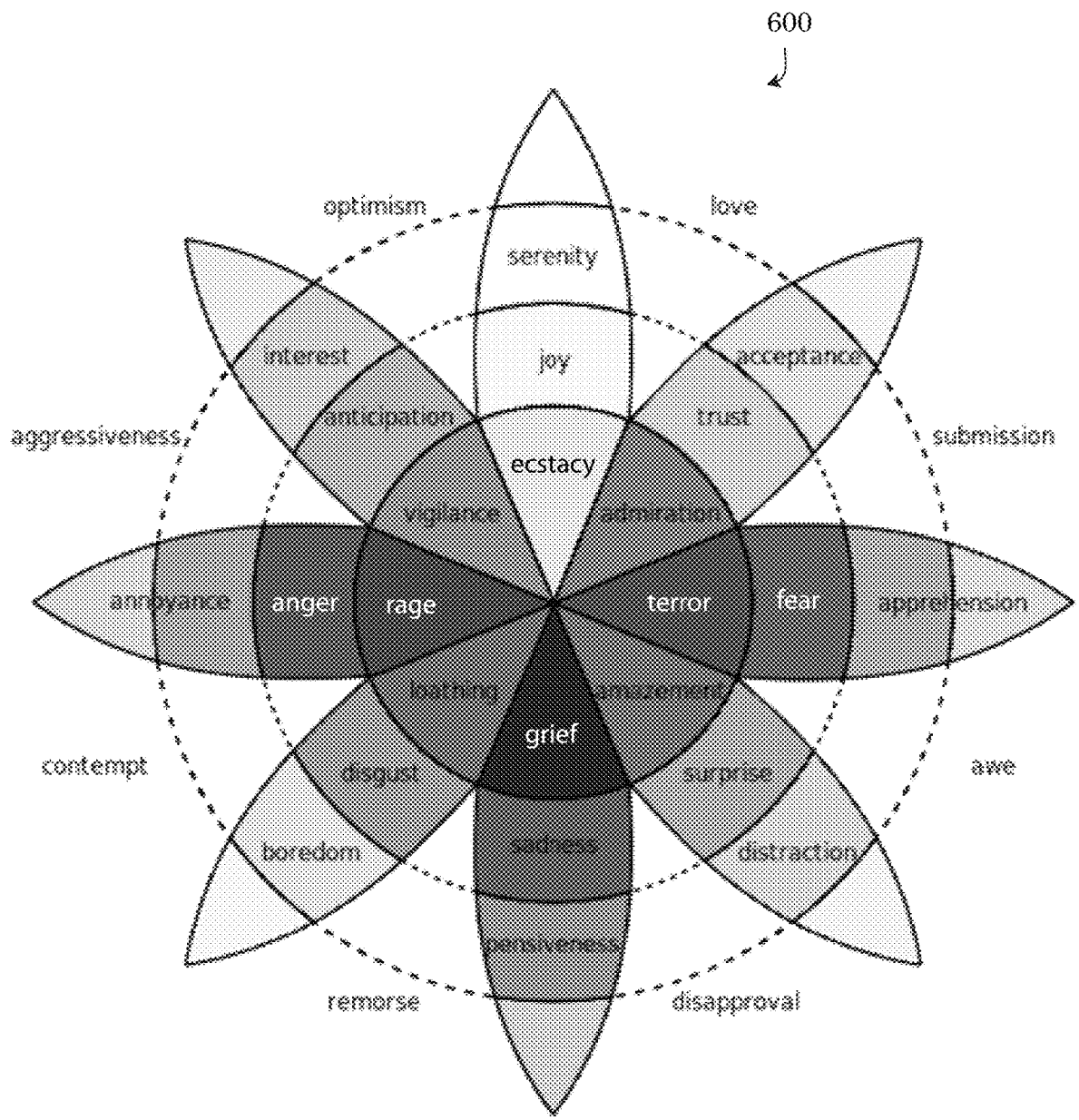
FIG. 6 depicts an embodiment of a Plutchik's wheel of emotion.

In some embodiments, the emotions of the reviewing user identified by analytics module may be selected from and compared to the emotions of a Plutchik's wheel of emotion 600, as shown in FIG. 6. The closer the emotive expression of the user is identified by the analytics module 107 to the center of the Plutchik wheel 600, the more of an impact the emotion may have on the likelihood of an event of interest being the root cause of the defect, and thus a higher interest score. On the other hand, the further from the center the identified emotive expression 505 of the user, the weaker the analytics module 107 may consider the emotive expression 505 and thus the emotive expression may have a lower impact on the interest score and ultimately a lower probability that the event of interest tied to the weaker emotive expression 505 is the root cause of the defects.

Embodiments of the analytics module 107 may be programmed to consider the variations of emotion that may be expressed by different users who may be reviewing each file. Embodiments of the computer system 101 may learn through the machine learning tools 110 and the pattern recognition module 109 the emotion ranges of each user. The computer system 101 may be able to scale or normalize more and less emotional or expressive individual users reviewing the files. The analytics module 107 may progressively learn the temperaments of the users reviewing the files and adjust the overall interest score accordingly. More emotional or less emotional users may be identified by the interest scores obtained over one or more different reviews of different files. For example, more emotionally expressive user may have consistently higher interest scores for each event of interest identified within a particular file, whereas a less emotional user may have consistently lower interest scores spanning across the events of interest in a particular file. In some embodiments, if the analytics module 107 identifies a user has having a set of interest scores for a particular file or across a series of unrelated files or reviewing assignments, that are consistently higher or lower than the average reviewer or a set threshold average, the analytics module 107 may apply a correction factor to normalize the interest scores of the particular user.

Embodiments of the interest score 509 may calculated by the analytics module 107 as a function of the recorded data collected and organized into one or more properties identified by the analytics module 107. Each of the properties may be assigned a numerical value based on a statistical model stored by the pattern detection module 109. For example, the model may be a linear regression model such as the one used to calculate the interest score 509 in FIG. 5. For instance, the sample model used to calculate the interest scores 509 in FIG. 5 was a linear regression model wherein the interest score=0.456(screen position)+0.674(time)+0.967(emotive expression)+0.231 (event text). In the sample model used to calculate the interest scores in FIG. 5, the viewing time 503 and the value allotted to the emotive expression 505 were each weighted higher than the value of the screen position 501 or event text 507. However, changes in the values, weighting of each property in the regression formula and/or type sample model used may vary.

Embodiments of the interest score 509 may be considered a probability that the event of interest identified is the root cause of the defects occurring. For instance, in some embodiments, the interest score may be a value from 0 to 1 inclusively as shown in FIG. 5. Comparing each of the interest scores side by side, the interest score 509 with the highest comparative value may be considered to be the most likely root cause of the defects being reviewed by the users. In some embodiments, the interest score may be converted into a percentage of probability or a percentage of certainty. For example, 0.55 may equal 55%, 0.85=85%, 0.3=30%, etc.

Embodiments of the root cause analysis module may further include a tagging module 111. The tagging module 111 may perform the task or function of adding identifying tags to one or more sections of event data 507 within the file being reviewed by the user. In some embodiments, the tags may be automatically generated by the tagging module 111 as a function of the interest score. Event data 507 may be tagged with different tags of various colors, sizes, information, abbreviations, or symbols to draw the user's attention to the event data and the type of tag added to the file may vary depending on how high or low the interest score may be. For instance an event of interest having an interest score of 0.8 to 1 may be tagged with identifiable tag in the file that alerts a user or subsequent user of the severity of the event. On the other hand, an event of interest having an interest score between 0.1 to 0.2 may have a different tag alerting a user of the event having a probability of being the root cause, but much less likely to be as severe of an event than the previous event with the score of 0.8 to 1.

A person skilled in the art should recognize that any number of ranges or cut off points in the interest score scale may be set for individual tags of increasing severity or importance. Any number of tag types can be pre-set and generated as a function of the interest score. For example, a different type of tag indicating an increasing level of severity may be set for every 0.01, 0.05. 0.1, 0.2, 0.3, 0.5, etc., increase in interest score. For instance using 0.1 as prototypical example, each different type of tag may generate as a function of the interest score between 0 to <0.1, 0.1 to <0.2, 0.2 to <0.3, 0.3 to <0.4, 0.4 to <0.5, 0.5 to <0.6, 0.6 to <0.7, 0.7 to <0.8, 0.8 to <0.9 and 0.9 to 1.0. The action of tagging the file being reviewed may alert subsequent users reviewing the file to pay particular attention to the tagged section or allow for a higher resource intensive user such as an SME to review the most severe tags first in an effort to focus on the most likely root causes of the defects or errors.

In some embodiments of the root cause analysis system, the system 200 and the computer system 101 may be connected to a network 210 via a network interface controller 124. for example, allowing the computer system to access network enabled resources for performing the root cause analysis. The network 210 may refer to a group of network-accessible computer systems 201*a*, 201*b* . . . 201*n* (hereinafter referred collectively as network-accessible computer systems) or other computing hardware devices, such as a network accessible data store 225, linked together through communication channels to facilitate communication and resource sharing among the computer systems and hardware devices. Elements depicted in the figures having reference numbers including sub-letters and ellipses, for example network-accessible computer system 201*a*, 201*b* . . . 201*n* may signify that the embodiments comprising the element are not limited only to the amount of elements actually shown in the drawings, but rather, the ellipses between the letters and the $n^{th}$ element indicate a variable number of similar elements of a similar type that may be present. In this case, each of the computer systems 201 may include some or all of the elements described above that may be present in or connected to computer system 101. Examples of network 210 may include a local area network (LAN), home area network (HAN), wide area network (WAN), back bone networks (BBN), peer to peer networks (P2P), campus networks, enterprise networks, the Internet, cloud computing networks and any other network known by a person skilled in the art.

In some embodiments, multiple users may perform a root cause analysis at each of the computer systems 101, 201 connected to the network 210. Each of the files being review may be stored locally or remotely accessible to one or more of the computer systems 101, 201 or the files being reviewed on the network 210 may be remotely stored in a network-accessible data store 225. Furthermore, in some embodiments, a computer system 101, 201 may not only use a network 210 for the purpose of allowing review of a file at multiple locations, either simultaneously or non-simultaneously, the system 200 may further be capable of leveraging the processing power and other resources of the computer network 210 to increase the computing capabilities of resource intensive functions such as the analytics module 107 to reduce the time it may take to analyze recorded data of collected by the recording module.

In alternative embodiments, each computer system 101, 201 of the network 210 having a reviewer reviewing a file for events of interest, may be recording and collecting data. The collected data from each reviewer may be collected to a central location or storage device such as network-accessible data store 225. Subsequently the aggregation of observable behavior recorded by each computer system 101, 201 for each reviewer may be analyzed as a whole, rather than on a user by user basis, to generate a single table of interest scores spanning multiple user reviews of the file. Under such embodiments, events of interest that are in common between multiple reviewers may increase the interest score for the particular event of interest that was identified by a plurality of reviewers, indicating a higher likelihood that the event is the root cause of a defect or error.

Method for Performing Root Cause Analysis

Figure 4:
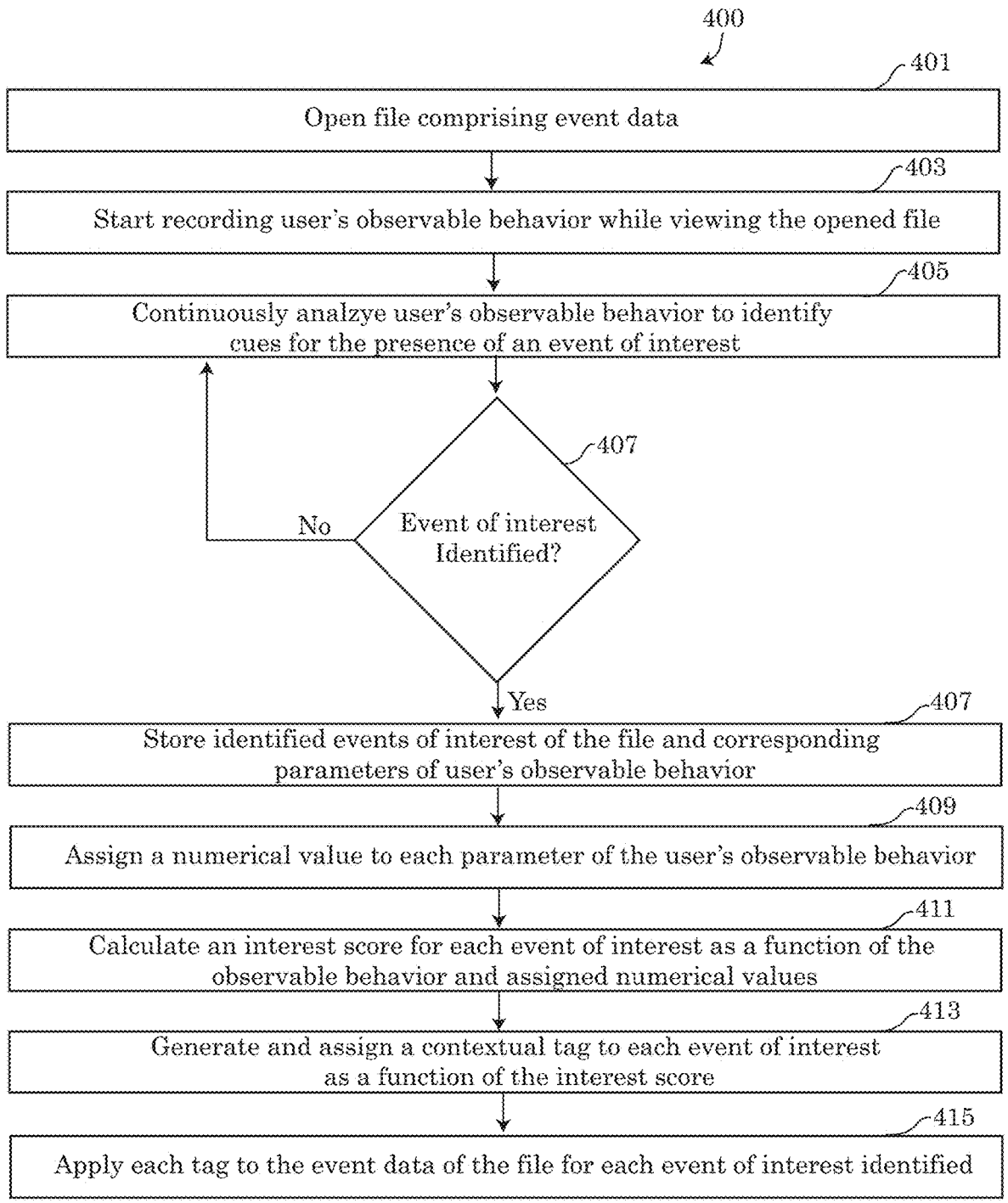
FIG. 4 depicts a flow chart describing an embodiment a method for performing a root cause analysis.

The drawing of FIG. 4 represents an embodiment 400 of a method or algorithm that may be implemented for performing a root cause analysis in accordance with the root cause analysis systems described in FIGS. 1-3*d* using one or more computers as defined generically in FIG. 7 below, and more specifically by the specific embodiments of FIGS. 1-3*d*, A person skilled in the art should recognize that the steps of the algorithm described in FIG. 4 may be performed in a different order than presented by FIG. 4 and the algorithm may not require all of the steps described herein to be performed. Rather some embodiments may implement a method for performing a root cause analysis using only one or more of the steps discussed below.

The method of FIG. 4 may initiate in step 401 upon opening a file comprising event data for review by a user. The user may select and open a file to review such as network files, data files, data dumps, crash logs, configuration files, source code, program code, or any other text based data describing conditions, operating environment or program code that may lead to system errors, defects, crashing or other undesirable effects. Upon opening the file in step 401, or upon manually activating the recording module 105 of the computer system 101 by the user performing the review of the file on (either locally or remotely), the computer system 101 may in step 403 start recording the user's observable behavior via an input device such as a biometric input device 119, mouse 319, keyboard 320, camera or microphone, while the user is viewing the opened file.

In some embodiments of the method, the recording module 105 collecting the recorded data, may transmit or stream the recorded data to the analytics module 107. In step 405 of the method for performing a root cause analysis, the analytics module 107 may apply analytical methods and models to the recorded data to continuously analyze the user's observable behavior in order to identify cues from the user's observable behavior that may indicate a presence of an event of interest to the user or other reviewers of the file tasked with identifying the root cause of a defect or error. In step 407, the analytics module 107 may draw a conclusion whether or not the recorded data of the user's observable behavior suggests an event of interest. If, in step 407, an event of interest has not been identified, the analytics module 107 may continue to analyze the recorded data being received from the recording module 105 in an effort to identify an event of interest that may indicate a root cause of a defect or error.

Conversely, if an event of interest to the analytics module 107 is identified in step 407, the analytics module 107 may store the event of interest identified in the file, and the corresponding parameters of the user's observable behavior that lead to the conclusion of the event data being of interest to identifying the root cause. The computer system 101 may store the recorded data and/or the parameters of the event of interest in a data store 125, network-accessible data store 225, data warehouse, data mart, etc. for further processing, query of analysis. For example, in some embodiments, the parameters of the event of interest identified from the recorded data may be tabulated and stored in a database for further calculations and querying by a user. FIG. 5 depicts an example of tabulated database entries for a plurality of events of interest and each corresponding parameter identified, such as screen position 501, time viewed 503, emotive expression 505 and text corresponding to the event data 507.

In step 409, the analytics module 107 may assign a numerical value to each of the parameters of the user's observable behavior. The numerical value assigned to each parameter may vary depending on the type of statistical methods, models and algorithms being used or applied to the parameter data. Once the observable behaviors, such as the emotive expression 505 of the user have been correlated to a numerical value, in step 411 the computer system 101 may calculate an interest score for each event of interest. The interest scores may be calculated as a function of the observable behavior of the user and the corresponding numerical values assigned for the user's particular observable behaviors. Each of the generated interest scores may be compared to determine a range of the most probable to least probable events of interest that may be the root cause of the defects, errors or other problems being identified by the user.

In step 413, the computer system 101 may generate and assign a tag to the text of the event data in the reviewed file for one or more of the events of interest having an interest score calculated in step 411. Each of the tags generated and assigned in step 413 may be generated as a function of the interest score, wherein changes in the value or ranges of the interest score may result in the generation of different tags being applied to the event data of the file. In some embodiments, the type of tag generated in step 413 may be dependent on the increasing severity and likelihood that the event data of the file is the root cause of the problem or defect.

In step 415, each tag generated in step 413 may be applied to the corresponding event data of the file for each of the events of interest identified in step 407. In some embodiments the type, size, color, or indicator of tag to the event data of a file may be performed as a function of the increasing severity and likelihood that the event data in the file is the root cause of a problem or defect. For example, events of interest having a higher severity or likelihood of being the root cause of a defect may be larger, more brightly colored or more attention grabbing than a tag applied to a less severe event of interest.

Computer System

Figure 7:
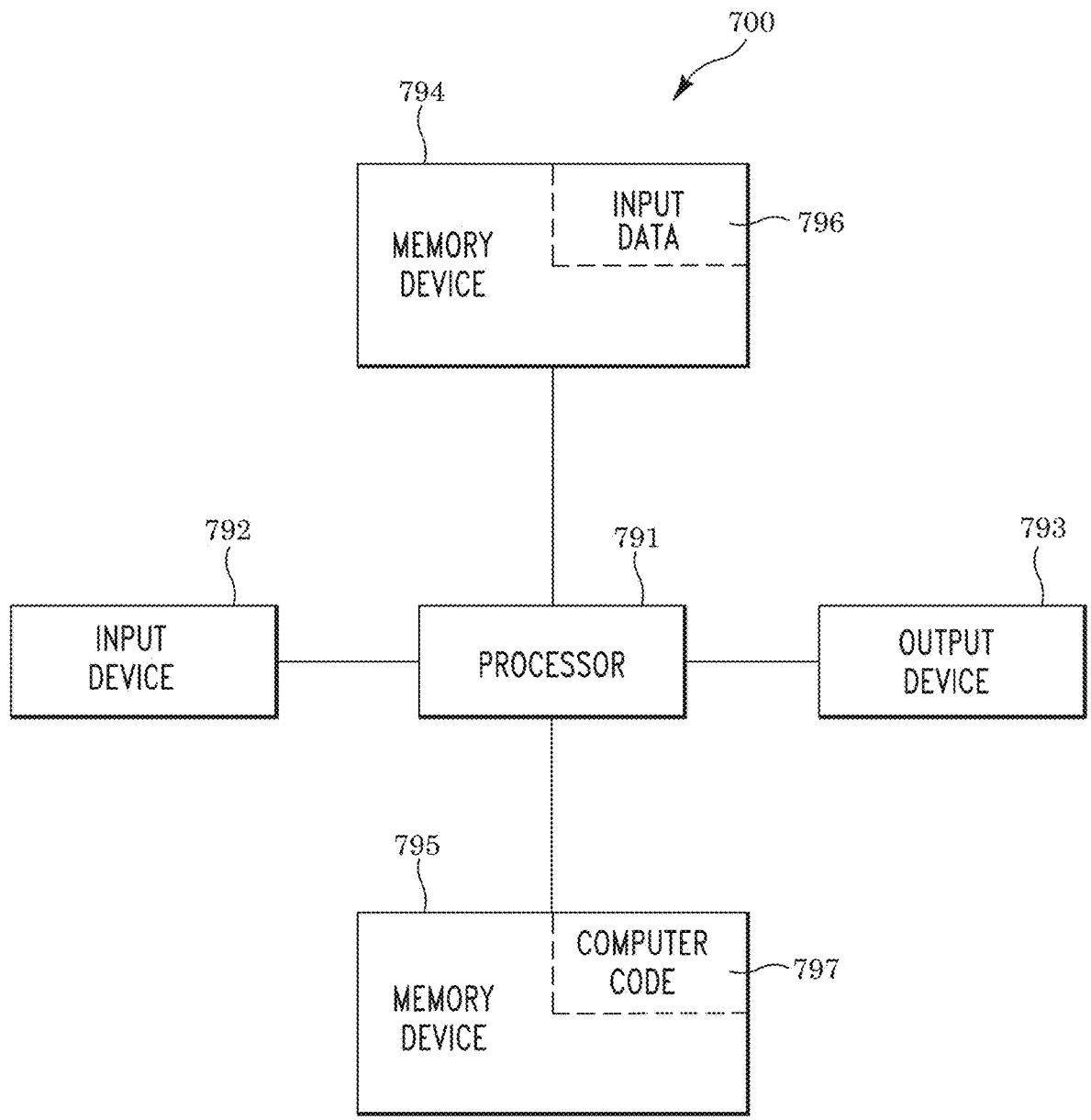
FIG. 7 depicts a block diagram of an embodiment of a computer system capable of implementing methods for performing a root cause analysis.

Referring to the drawings, FIG. 7 illustrates a block diagram of a computer system 700 that may be included in the systems of FIGS. 1-3d and for implementing methods for performing a root cause analysis as shown in the embodiment of FIG. 4 and in accordance with the embodiments of the present disclosure. The computer system 700 may generally comprise a processor, otherwise referred to as a central processing unit (CPU) 791, an input device 792 coupled to the processor 791, an output device 793 coupled to the processor 791, and memory devices 794 and 795 each coupled to the processor 791. The input device 792, output device 793 and memory devices 794, 795 may each be coupled to the processor 791 via a bus. Processor 791 may perform computations and control the functions of computer 700, including executing instructions included in the computer code 797 for tools and programs for performing a root cause analysis, in the manner prescribed by the embodiments of the disclosure using the systems of FIGS. 1-3, wherein the instructions of the computer code 797 may be executed by processor 791 via memory device 795. The computer code 797 may include software or program instructions that may implement one or more algorithms for implementing the methods for performing a root cause analysis, as described in detail above. The processor 791 executes the computer code 797. Processor 791 may include a single processing unit, or may be distributed across one or more processing units in one or more locations (e.g., on a client and server). The memory device 794 may include input data 796. The input data 796 includes any inputs required by the computer code 797. The output device 793 displays output from the computer code 797. Either or both memory devices 794 and 795 may be used as a computer usable storage medium (or program storage device) having a computer readable program embodied therein and/or having other data stored therein, wherein the computer readable program comprises the computer code 797. Generally, a computer program product (or, alternatively, an article of manufacture) of the computer system 700 may comprise said computer usable storage medium (or said program storage device).

Memory devices 794, 795 include any known computer readable storage medium, including those described in detail below. In one embodiment, cache memory elements of memory devices 794, 795 may provide temporary storage of at least some program code (e.g., computer code 797) in order to reduce the number of times code must be retrieved from bulk storage while instructions of the computer code 797 are executed. Moreover, similar processor 791, memory devices 794, 795 may reside at a single physical location, including one or more types of data storage, or be distributed across a plurality of physical systems in various forms. Further, memory devices 794, 795 can include data distributed across, for example, a local area network (LAN) or a wide area network (WAN). Further, memory devices 794, 795 may include an operating system (not shown) and may include other systems not shown in FIGS. 1-6.

In some embodiments, the computer system 700 may further be coupled to an Input/output (I/O) interface and a computer data storage unit. An I/O interface may include any system for exchanging information to or from an input device 792 or output device 793. The input device 792 may be, inter alia, a keyboard, a mouse, sensors, biometric input device, camera, etc. The output device 793 may be, inter alia, a printer, a plotter, a display device (such as a computer screen or monitor), a magnetic tape, a removable hard disk, a floppy disk, etc. The memory devices 794 and 795 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer 200, and may include any type of transmission link, including electrical, optical, wireless, etc.

An I/O interface may allow computer system 700 to store information (e.g., data or program instructions such as program code 797) on and retrieve the information from computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk).

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to accessing content of a shared account. Thus, an embodiment of the present invention discloses a process for supporting computer infrastructure, where the process includes providing at least one support service for at least one of integrating, hosting, maintaining and deploying computer-readable code (e.g., program code 797) in a computer system (e.g., computer 700) including one or more processor(s) 791, wherein the processor(s) carry out instructions contained in the computer code 797 causing the computer system to automatically configure multiple display devices. Another embodiment discloses a process for supporting computer infrastructure, where the process includes integrating computer-readable program code into a computer system including a processor.

The step of integrating includes storing the program code in a computer-readable storage device of the computer system through use of the processor. The program code, upon being executed by the processor, implements a method of accessing content of a shared account. Thus the present invention discloses a process for supporting, deploying and/or integrating computer infrastructure, integrating, hosting, maintaining, and deploying computer-readable code into the computer system 700, wherein the code in combination with the computer system 700 is capable of performing a method for performing a root cause analysis.

A computer program product of the present invention comprises one or more computer readable hardware storage devices having computer readable program code stored therein, said program code containing instructions executable by one or more processors of a computer system to implement the methods of the present invention.

A computer program product of the present invention comprises one or more computer readable hardware storage devices having computer readable program code stored therein, said program code containing instructions executable by one or more processors of a computer system to implement the methods of the present invention.

A computer system of the present invention comprises one or more processors, one or more memories, and one or more computer readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for performing a root cause analysis, said method comprising:
    tracking, by a central processing unit (CPU), a focal point of a user's eye gaze;
    correlating, by the CPU, the focal point of the user's eye gaze to a viewing position of a display device displaying a file that includes event data being viewed by the user;
    identifying, by the CPU, as a function of the viewing position, events of interest in the event data and an amount of time that the event data is viewed by the user;
    identifying, by the CPU, an emotive expression of the user during an amount of time the user's eye glaze is focused on the viewing position,
    inserting, by the CPU, a numerical value assigned to the viewing position, the amount of time, the emotive expression and text of the event data, into a linear regression model; and
    outputting, by the CPU, as a function of the linear regression model, an interest score pertaining to one or more events of interest that were previously identified as a function of the user's eye gaze, said interest score being a probability of each identified event of interest being a root cause of a defect.

2. The method of claim 1, said method further comprising:
    recording, by the CPU, recordation data of the user's eye gaze while viewing the event data of the file.

3. The method of claim 1, wherein the file including event data is selected from the group consisting of a log file, a configuration file, and source code.

4. The method of claim 1, wherein the linear regression model outputs a value of the interest score between 0-1 inclusively.

5. The method of claim 1, said method further comprising:
generating a color-coded tag in the file, based on severity of the one or more events of interest.

6. The method of claim 1, said method further comprising:
tagging, by the CPU, each event of interest within the file with a tag as a function of each interest score.

7. The method of claim 1, wherein the closer the emotive expression of the user is to a center of a Plutchik wheel of emotion, the higher is the probability that one or more of the identified events of interest is the root cause of the defect.

8. A computer program product comprising:
one or more computer readable hardware storage devices having computer readable program code stored therein, said program code containing instructions executable by a central processing unit (CPU) to implement a method for performing a root cause analysis, said method comprising:
tracking, by the CPU, a focal point of a user's eye gaze;
correlating, by the CPU, the focal point of the user's eye gaze to a viewing position of a display device displaying a file that includes event data being viewed by the user;
identifying, by the CPU, as a function of the viewing position, events of interest in the event data and an amount of time that the event data is viewed by the user;
identifying, by the CPU, an emotive expression of the user during an amount of time the user's eye glaze is focused on the viewing position,
inserting, by the CPU, a numerical value assigned to the viewing position, the amount of time, the emotive expression and text of the event data, into a linear regression model; and
outputting, by the CPU, as a function of the linear regression model, an interest score pertaining to one or more events of interest that were previously identified as a function of the user's eye gaze, said interest score being a probability of each identified event of interest being a root cause of a defect.

9. The computer program product of claim 8, said method further comprising:
recording, by the CPU, recordation data of the user's eye gaze while viewing the event data of the file.

10. The computer program product of claim 8, wherein the file including event data is selected from the group consisting of a log file, a configuration fife, and source code.

11. The computer program product of claim 8, wherein the linear regression model outputs a value of the interest score between 0-1 inclusively.

12. The computer program product of claim 8, said method further comprising:
generating a color-coded tag in the file, based on severity of the one or more events of interest.

13. The computer program product of claim 8, said method further comprising:
tagging, by the CPU, each event of interest within the file with a tag as a function of each interest score.

14. The computer program product of claim 8, wherein the closer the emotive expression of the user is to a center of a Plutchik wheel of emotion, the higher is the probability that one or more of the identified events of interest is the root cause of the defect.

15. A computer system, comprising: a central processing unit (CPU); a memory device coupled to the CPU; and a computer readable storage device coupled to the processor, wherein the storage device contains program code executable by the CPU via the memory device to implement a method for performing a root cause analysis, said method comprising:
tracking, by the CPU, a focal point of a user's eye gaze;
correlating, by the CPU, the focal point of the user's eye gaze to a viewing position of a display device displaying a file that includes event data being viewed by the user;
identifying, by the CPU, as a function of the viewing position, events of interest in the event data and an amount of time that the event data is viewed by the user;
identifying, by the CPU, an emotive expression of the user during an amount of time the user's eye glaze is focused on the viewing position,
inserting, by the CPU, a numerical value assigned to the viewing position, the amount of time, the emotive expression and text of the event data, into a linear regression model; and
outputting, by the CPU, as a function of the linear regression model, an interest score pertaining to one or more events of interest that were previously identified as a function of the user's eye gaze, said interest score being a probability of each identified event of interest being a root cause of a defect.

16. The computer system of claim 15, said method further comprising:
recording, by the CPU, recordation data of the user's eye gaze while viewing the event data of the file.

17. The computer system of claim 15, wherein the file including event data is selected from the group consisting of a log file, a configuration file, and source code.

18. The computer system of claim 15, wherein the linear regression model outputs a value of the interest score between 0-1 inclusively.

19. The computer system of claim 15, said method further comprising:
generating a color-coded tag in the file, based on severity of the one or more events of interest.

20. The computer system of claim 15, said method further comprising:
tagging, by the CPU, each event of interest within the file with a tag as a function of each interest score.

* * * * *